United States Patent
Ogihara et al.

(10) Patent No.: US 10,126,753 B2
(45) Date of Patent: Nov. 13, 2018

(54) WORK MACHINE CONTROL SYSTEM, WORK MACHINE, WORK MACHINE MANAGEMENT SYSTEM, AND METHOD FOR CONTROLLING WORK MACHINE

(71) Applicant: Komatsu Ltd., Tokyo (JP)

(72) Inventors: Masanori Ogihara, Hiratsuka (JP); Masanori Tojima, Fujisawa (JP)

(73) Assignee: Komatsu Ltd., Tokyo (JP)

( * ) Notice: Subject to any disclaimer, the term of this patent is extended or adjusted under 35 U.S.C. 154(b) by 98 days.

(21) Appl. No.: 15/122,717

(22) PCT Filed: Nov. 30, 2015

(86) PCT No.: PCT/JP2015/083671
§ 371 (c)(1),
(2) Date: Aug. 31, 2016

(87) PCT Pub. No.: WO2016/060283
PCT Pub. Date: Apr. 21, 2016

(65) Prior Publication Data
US 2017/0153649 A1 Jun. 1, 2017

(51) Int. Cl.
*G05D 1/02* (2006.01)
*B60T 7/12* (2006.01)
(Continued)

(52) U.S. Cl.
CPC .............. *G05D 1/0268* (2013.01); *B60T 7/12* (2013.01); *B62D 15/021* (2013.01); *G05D 1/027* (2013.01);
(Continued)

(58) Field of Classification Search
CPC .............. G05D 1/0268; G05D 1/0223; G05D 2201/021; B62D 15/021; B60T 7/12; G05B 2270/329; G01C 22/025
See application file for complete search history.

(56) References Cited

U.S. PATENT DOCUMENTS 4,700,302 A * 10/1987 Arakawa .............. G05D 1/0265
180/168
5,014,204 A * 5/1991 Kamimura ........... G05D 1/0244
180/167
(Continued)

FOREIGN PATENT DOCUMENTS

JP 61-148513 A 7/1986
JP 06-035534 A 2/1994
(Continued)

OTHER PUBLICATIONS

Translation of KR20040038469A. Obtained on Jan. 31, 2017. (Year: 2004).*
(Continued)

*Primary Examiner* — Jeffrey C Boomer
(74) *Attorney, Agent, or Firm* — Locke Lord LLP (57) ABSTRACT

A work machine control system includes a steering device configured to operate steering wheels of a work machine, a posture detector configured to detect a first azimuth as information on an orientation of the work machine, a steering angle detector configured to detect a steering angle of the steering device, an azimuth calculation unit configured to obtain a second azimuth of the work machine by using the steering angle detected by the steering angle detector, and a vehicle control unit configured to control the steering device by using either the first azimuth or the second azimuth, wherein the first azimuth or the second azimuth is switched to be transmitted to the vehicle control unit.

8 Claims, 8 Drawing Sheets

(51) Int. Cl.
　　　*B62D 15/02*　　　(2006.01)
　　　*G01C 22/02*　　　(2006.01)
(52) U.S. Cl.
　　　CPC ...... *G05D 1/0223* (2013.01); *F05B 2270/329* (2013.01); *G01C 22/025* (2013.01); *G05D 2201/021* (2013.01)

(56) References Cited

U.S. PATENT DOCUMENTS

| | | | | |
|---|---|---|---|---|
| 5,629,709 | A * | 5/1997 | Yamashita | H01Q 1/1257 342/359 |
| 6,226,591 | B1 * | 5/2001 | Okumura | G01C 21/28 701/409 |
| 2002/0099481 | A1 * | 7/2002 | Mori | G01C 21/12 701/23 |
| 2006/0038718 | A1 * | 2/2006 | Arakane | G01C 21/165 342/357.32 |
| 2007/0185644 | A1 * | 8/2007 | Hirose | G01C 21/265 701/532 |
| 2009/0192674 | A1 * | 7/2009 | Simons | B60G 17/018 701/37 |
| 2010/0019963 | A1 * | 1/2010 | Gao | G01S 5/0027 342/357.31 |
| 2012/0283941 | A1 * | 11/2012 | Kang | G01C 21/3658 701/410 |
| 2015/0149073 | A1 * | 5/2015 | Ishigami | G01C 21/28 701/409 |
| 2016/0016646 | A1 * | 1/2016 | Mun | G01C 21/203 701/21 |
| 2017/0122741 | A1 * | 5/2017 | Sakai | G01S 19/46 |
| 2017/0131722 | A1 * | 5/2017 | Hiramatsu | G05D 1/0278 |
| 2017/0174123 | A1 * | 6/2017 | Ogihara | B60Q 1/346 |
| 2018/0074201 | A1 * | 3/2018 | Sakai | G05D 1/0088 |

FOREIGN PATENT DOCUMENTS

| | | |
|---|---|---|
| JP | 06-067723 A | 3/1994 |
| JP | 11-231936 A | 8/1999 |
| JP | 2000-035820 A | 2/2000 |
| JP | 2000-122721 A | 4/2000 |
| JP | 2002-358122 A | 12/2002 |
| KR | 20040038469 A * | 5/2004 |

OTHER PUBLICATIONS

International Search Report dated Jan. 26, 2016, issued for PCT/JP2015/083671.

* cited by examiner

TRAVELING SPEED

WORK MACHINE CONTROL SYSTEM, WORK MACHINE, WORK MACHINE MANAGEMENT SYSTEM, AND METHOD FOR CONTROLLING WORK MACHINE

FIELD

The present invention relates to a work machine control system, a work machine, a work machine management system, and a method for controlling a work machine.

BACKGROUND

Various mining machines such as excavator and dump truck operate in a mining site. There are known unmanned mining machines controlled to travel in a mine along set target traveling courses. Such an unmanned mining machine autonomously travels by dead-reckoning navigation using information detected by a device for detecting an orientation of the mining machine.

CITATION LIST

Patent Literature

Patent Literature 1: Japanese Patent Application Laid-open No. 11-231936

SUMMARY

Technical Problem

Patent Literature 1 describes therein a technique in which when an emergency stop instruction is detected, an orientation of a vehicle body is corrected toward a desired traveling direction based on an offset between the orientation of the vehicle body acquired by a vehicle body posture detection unit and the desired traveling direction. With the technique described in Patent Literature 1, however, when a failure occurs in the vehicle body posture detection unit, an orientation of the vehicle body cannot be corrected in some cases. For unmanned work machines including unmanned mining machines, even when a failure occurs in a device mounted on a work machine for detecting an orientation, it is desired that a steering device is controlled to travel without largely deviating from a target traveling course.

According to aspects of the present invention, it is an object to prevent a work machine from largely deviating from a target traveling course even when a failure occurs in a device mounted on the work machine for detecting an orientation in the unmanned work machine controlled to travel in a mine along the set target traveling course.

Solution to Problem

According to a first aspect of the present invention, a work machine control system comprises: a steering device configured to operate steering wheels of a work machine; a posture detector configured to detect a first azimuth as information on an orientation of the work machine; a steering angle detector configured to detect a steering angle of the steering device; an azimuth calculation unit configured to obtain a second azimuth of the work machine by using the steering angle detected by the steering angle detector; and a vehicle control unit configured to control the steering device based on at least one of the first azimuth and the second azimuth, wherein when the posture detector is disabled, the vehicle control unit controls the steering device based on the second azimuth.

According to a second aspect of the present invention, in the work machine control system according to the first aspect, wherein the first azimuth or the second azimuth is switched to be input into the vehicle control unit.

According to a third aspect of the present invention, in the work machine control system according to the first or second aspect, wherein when the posture detector is enabled, the vehicle control unit controls the steering device in the work machine by using the first azimuth.

According to a fourth aspect of the present invention, in the work machine control system according to any one of the first to third aspects, the work machine control system comprises: a position detector provided in the work machine, the position detector being configured to detect a position of the work machine; and a correction unit configured to obtain and output an amount of correction for correcting the second azimuth by using a position of the work machine obtained by the position detector, wherein the vehicle control unit is configured to control the steering device by using the first azimuth or the corrected second azimuth.

According to a fifth aspect of the present invention, in the work machine control system according to the third aspect, wherein the correction unit is configured to change the amount of correction based on a traveling speed of the work machine.

According to a sixth aspect of the present invention, in the work machine control system according to the fourth or fifth aspect, wherein the vehicle control unit is configured to control the steering device in the work machine by using the first azimuth when the posture detector is enabled, and is configured to control the steering device by using the corrected second azimuth when the posture detector is disabled.

According to a seventh aspect of the present invention, in the work machine control system according to any one of aspect 2 to aspect 6, wherein when the posture detector is disabled, the vehicle control unit controls a braking device in the work machine to stop the work machine.

According to an eighth aspect of the present invention, a work machine includes the work machine control system according to any one of aspect 1 to aspect 7.

According to a ninth aspect of the present invention, a work machine management system includes a management device configured to output traveling condition information including a target traveling speed of a work machine and a target traveling course of the work machine to the work machine according to eighth aspect.

According to a tenth aspect of the present invention, a method for controlling a work machine comprises: detecting a first azimuth as information on an orientation of a work machine; obtaining a second azimuth of the work machine based on a steering angle of a steering device in the work machine; and controlling the steering device based on the second azimuth when the first azimuth cannot be detected.

According to a tenth aspect of the present invention, a method for controlling a work machine comprises: determining whether a posture detector configured to detect a posture of a work machine is enabled; and controlling a steering device in the work machine by using a first azimuth as information on an orientation of the work machine detected by the posture detector when the posture detector is enabled, and controlling the steering device by using a second azimuth of the work machine acquired by using a steering angle of the steering device in the work machine when the posture detector is disabled.

According to the aspects of the present invention, it is possible to prevent a work machine from largely deviating from a target traveling course even when a failure occurs in a device mounted on the work machine for detecting an orientation in the unmanned work machine controlled to travel in a mine along the set target traveling course.

DESCRIPTION OF EMBODIMENTS

An exemplary embodiment for carrying out the present invention will be described in detail with reference to the drawings.

<Outline of Work Machine Management System>

Figure 1:
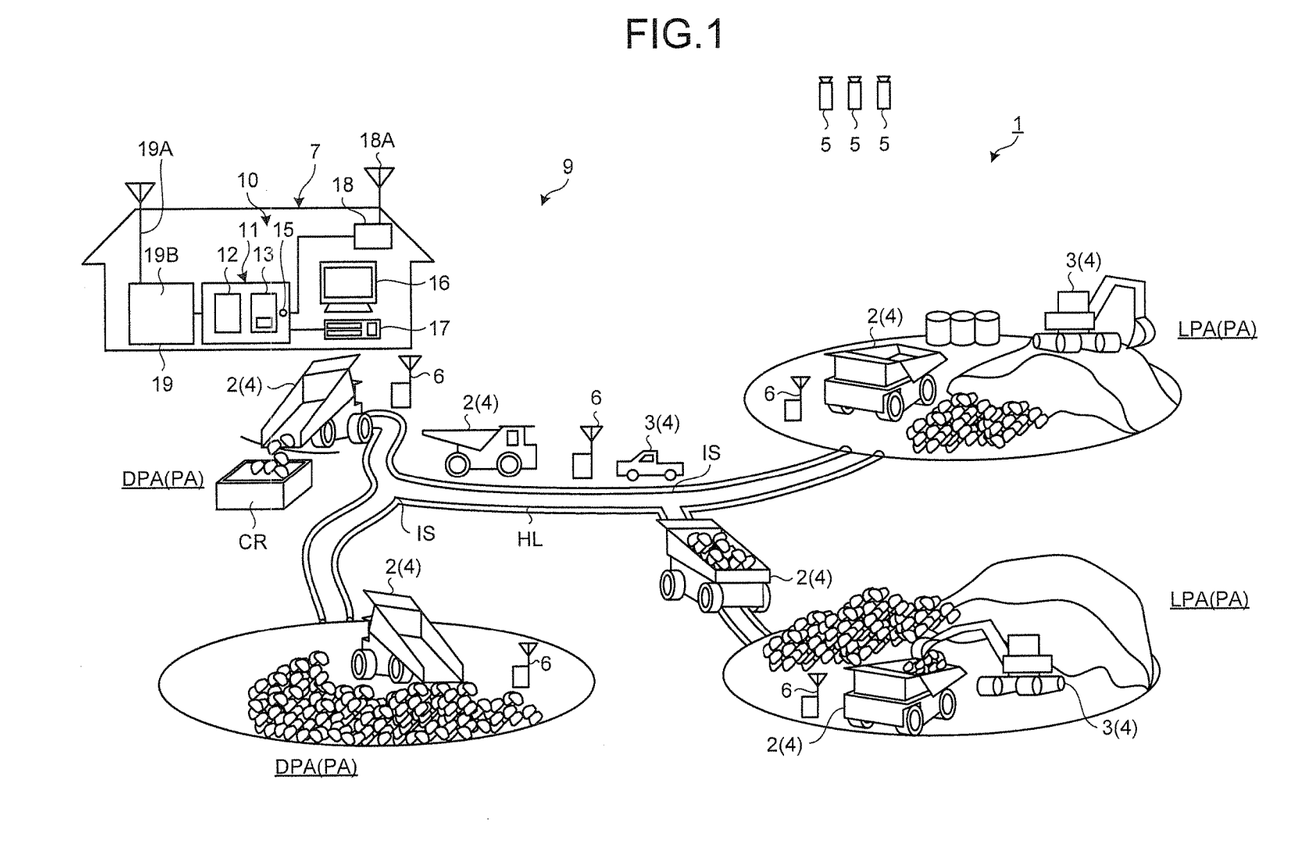
FIG. 1 is a diagram illustrating an exemplary work machine management system according to an exemplary embodiment.

FIG. 1 is a diagram illustrating an exemplary work machine management system 1 according to the present exemplary embodiment. In the following, the work machine management system 1 will be denoted as a management system 1 as needed. The management system 1 manages work machines 4. The management of the work machines 4 includes at least one of operational management of the work machines 4, productivity evaluation of the work machines 4, operator's operation technique evaluation of the work machines 4, maintenance of the work machines 4, and abnormality diagnosis of the work machines 4. The description will be made below assuming that the work machines are mining machines used in a mine.

The term mining machine as exemplary work machine is a collective term of machinery used for various works in a mine. The work machines 4 include at least one of a boring machine, an excavation machine, a loading machine, a transporting machine, a crushing machine, and an operator-driving vehicle. The excavation machine is a work machine for excavating a mine. The loading machine is a work machine for loading freight on a transporting machine. The loading machine includes at least one of an excavator, an electric shovel, and a wheel loader. The transporting machine is a work machine for transporting freight. The crushing machine is a work machine for crushing earth charged by a transporting machine. The work machines 4 can move in a mine.

According to the present exemplary embodiment, the work machines 4 include dump trucks 2 as transporting machines capable of traveling in a mine, and different work machines 3 from the dump trucks 2. According to the present exemplary embodiment, there will be described a case in which the dump trucks 2 are mainly managed by the management system 1.

As illustrated in FIG. 1, the dump truck 2 travels at least in a working site PA in a mine and along a carrying route HL leading to the working site PA. The dump truck 2 travels along a target traveling course set for the carrying route HL and the working site PA.

The working site PA includes at least one of a loading site LPA and a discharging site DPA. The loading site LPA is an area where a loading work of loading freight on the dump truck 2 is performed. The discharging site DPA is an area where a discharging work of discharging freight from the dump truck 2 is performed. In the example illustrated in FIG. 1, a crushing machine CR is provided in at least part of the discharging site DPA.

According to the present exemplary embodiment, the description will be made assuming that the dump truck 2 is an unmanned dump truck autonomously traveling in a mine in response to an instruction signal from a management device 10. The autonomous traveling of the dump truck 2 is to travel in response to an instruction signal from the management device 10 not via a driver's operation. The unmanned dump truck also has a function of traveling by a driver's operation when a failure occurs, for example.

In FIG. 1, the management system 1 comprises the management device 10 arranged in a control facility 7 installed in a mine, and a communication system 9. The communication system 9 includes a plurality of relaying instruments 6 for relaying at least one of data and instruction signals. The communication system 9 wirelessly communicates data or instruction signals between the management device 10 and the work machines 4. The communication system 9 wirelessly communicates data or instruction signals between the work machines 4.

According to the present exemplary embodiment, positions of the dump trucks 2 and positions of other work machines 3 are detected by use of GNSS (Global Navigation Satellite System). GNSS may be GPS (Global Positioning System) by way of example, but is not limited thereto. GNSS has a plurality of positioning satellites 5. GNSS detects a position defined by coordinate data such as latitude, longitude, and altitude. A position detected by GNSS is an absolute position defined in the global coordinate system. Positions of the dump trucks 2 and positions of other work machines 3 in a mine are detected by RTK-GNSS.

In the following description, a position detected by GNSS will be denoted as a GPS position as needed. The GPS position is an absolute position, and includes coordinate data such as latitude, longitude and altitude. The absolute position includes an estimated position of the dump truck 2 estimated at high accuracy.

<Management Device 10>

The management device 10 will be described below. The management device 10 transmits at least one of data and instruction signals to the work machines 4 and receives data from the work machines 4. As illustrated in FIG. 1, the management device 10 comprises a computer 11, a display device 16, an input device 17, and a wireless communication device 18.

The computer 11 comprises a processing device 12, a storage device 13, and an I/O unit 15. The display device 16, the input device 17, and the wireless communication device 18 are connected to the computer 11 via the I/O unit 15.

The processing device 12 performs a calculation processing for managing the work machines 4. The storage device 13 is connected to the processing device 12 and stores therein data for managing the work machines 4. The input device 17 is directed for inputting the data for managing the work machines 4 in the processing device 12. The processing device 12 performs the calculation processing by use of the data stored in the storage device 13, the data input from the input device 17, and the data acquired via the communication system 9. The display device 16 displays calculation processing results and the like of the processing device 12.

The wireless communication device 18 is arranged in the control facility 7, includes an antenna 18A, and is connected to the processing device 12 via the I/O unit 15. The communication system 9 includes the wireless communication device 18. The wireless communication device 18 can receive data transmitted from the work machines 4, and the received data is output to the processing device 12 and is stored in the storage device 13. The wireless communication device 18 can transmit data to the work machines 4.

Figure 2:
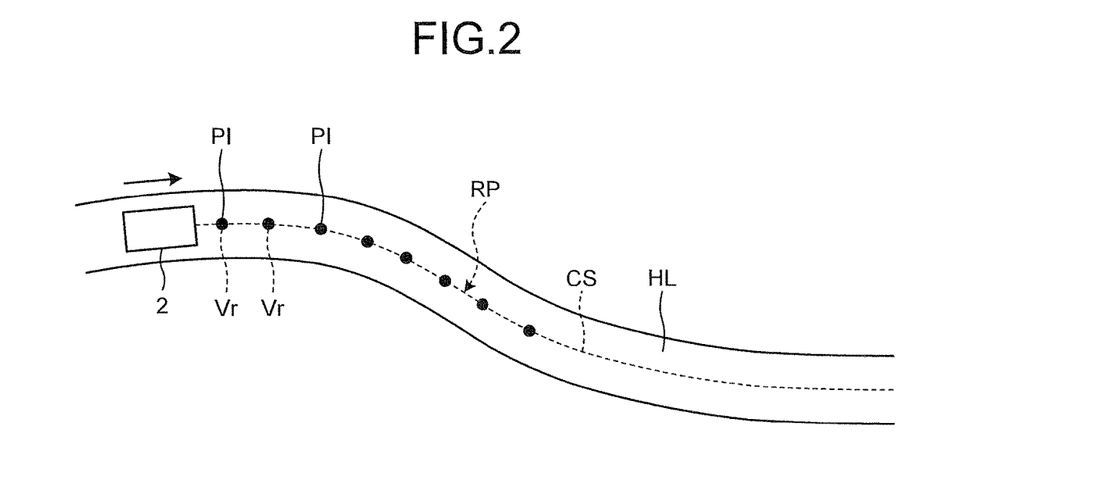
FIG. 2 is a schematic diagram illustrating a dump truck traveling along a carrying route.

FIG. 2 is a schematic diagram illustrating the dump truck 2 traveling along the carrying route HL. The processing device 12 in the management device 10 functions as a traveling condition information generation unit for generating traveling condition information including target traveling speeds Vr and a target traveling course RP of the dump truck 2 traveling in a mine. The target traveling course RP is defined by course data CS. The course data CS is a set of points PI defined with absolute positions (coordinates), respectively. A trajectory passing through the points PI is a target traveling course RP. The processing device 12 sets the target traveling speeds Vr of the dump truck 2 for the points PI, respectively. The management device 10 outputs the traveling condition information including the target traveling course RP having a plurality of points PI and the target traveling speeds Vr at the respective points PI to the dump truck 2 via the communication system 9. The dump truck 2 travels in a mine according to the traveling condition information transmitted from the management device 10.

<Dump Truck 2>

Figure 3:
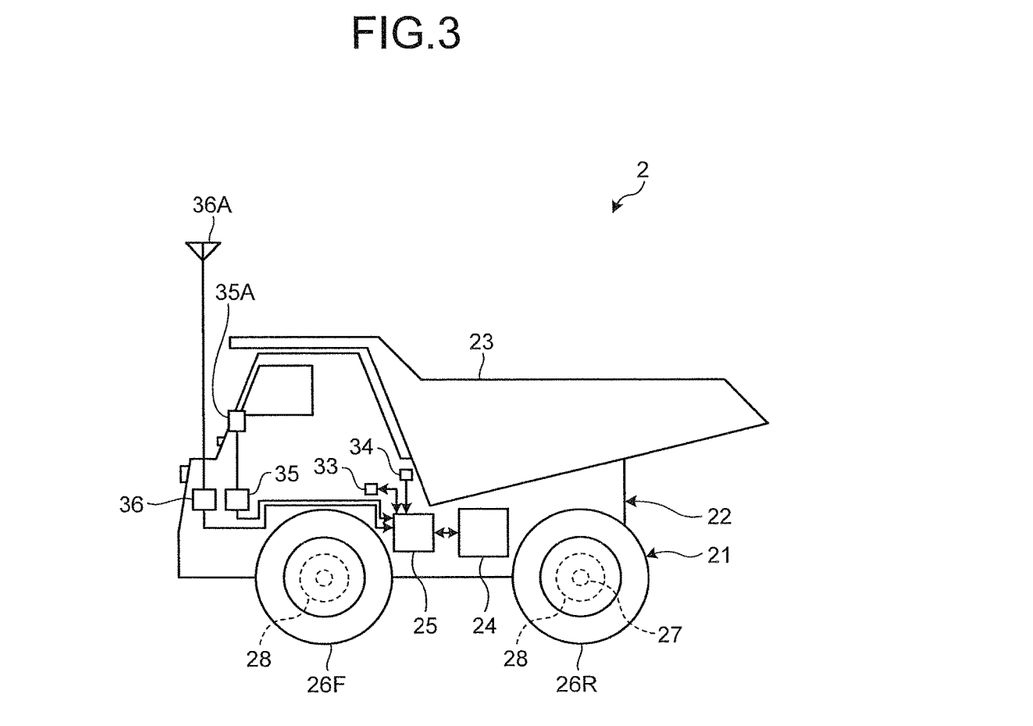
FIG. 3 is a diagram schematically illustrating an exemplary dump truck according to the exemplary embodiment.
Figure 4:
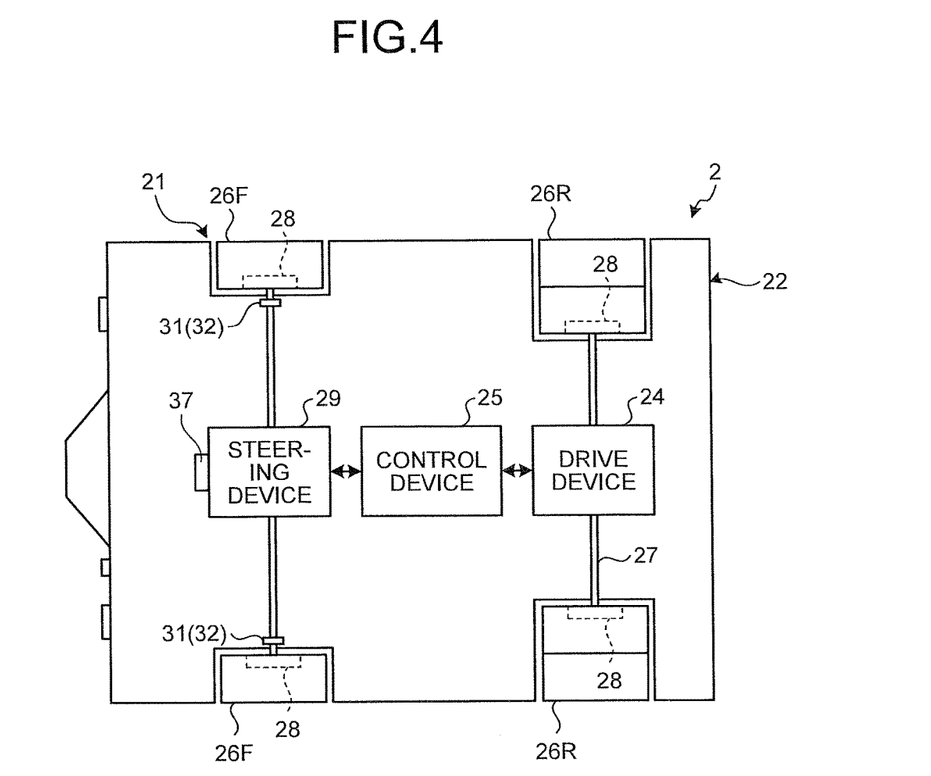
FIG. 4 is a diagram schematically illustrating an exemplary dump truck according to the exemplary embodiment.

FIG. 3 and FIG. 4 are the diagrams schematically illustrating an exemplary dump truck 2 according to the present exemplary embodiment.

The dump truck 2 comprises a traveling device 21 for causing the dump truck 2 to travel, a vehicle main body 22 attached with the traveling device 21, a vessel 23 supported on the vehicle main body 22, a drive device 24 for driving the traveling device 21, and a control device 25.

The traveling device 21 includes wheels 26F and wheels 26R, axles 27 for transmitting power to the wheels 26R, braking devices 28 for braking the wheels 26F and the wheels 26R, and a steering device 29 capable of adjusting a traveling direction. The wheels 26R will be denoted as driving wheels 26R as needed.

The traveling device 21 operates by a drive force generated by the drive device 24. The drive device 24 generates a drive force for accelerating the dump truck 2. The drive device 24 drives the traveling device 21 in an electric drive system. The drive device 24 includes an internal combustion engine such as diesel engine, a generator operating by power of the internal combustion engine, and a motor operating by power generated by the generator. A drive force generated by the motor is transmitted to the driving wheels 26R of the traveling device 21. The driving wheels 26R rotate by the drive force generated by the motor thereby to cause the dump truck 2 to travel. In this way, the dump truck 2 travels by the drive force of the drive device 24 provided in the vehicle main body 22. Output of the drive device 24 is adjusted so that a traveling speed of the dump truck 2 is adjusted. The drive device 24 is not limited to the electric drive system. The drive device 24 may employ a drive system in which power generated by the internal combustion engine is transmitted to the driving wheels 26R of the traveling device 21 via a power transmission device.

The steering device 29 adjusts a traveling direction of the traveling device 21. A traveling direction of the dump truck 2 includes an orientation of the front of the vehicle main body 22. The steering device 29 operates the wheels 26F thereby to change an orientation of the wheels 26F, thereby adjusting a traveling direction of the dump truck 2. The wheels 26F will be denoted as steering wheels 26F below as needed.

The braking device 28 generates a braking force for decelerating or stopping the dump truck 2. The control device 25 outputs an accelerating instruction signal for operating the drive device 24, a braking instruction signal for operating the braking devices 28, and a steering instruction signal for operating the steering device 29. The drive device 24 generates a drive force for accelerating the dump truck 2 in response to the accelerating instruction signal output from the control device 25. The braking device 28 generates a braking force for decelerating or stopping the dump truck 2 in response to the braking instruction signal output from the control device 25. The steering device 29 generates a force for changing an orientation of the steering wheels 26F in order to cause the dump truck 2 to travel straight or turn in response to the steering instruction signal output from the control device 25.

The dump truck 2 comprises a traveling speed detector 31 for detecting a traveling speed Vs of the dump truck 2, an acceleration detector 32 for detecting an acceleration As of the dump truck 2, a posture detector 33 for detecting a posture of the dump truck 2, and a steering angle detector 37 for detecting a steering angle as an angle at which the steering wheels 26F are steered by the steering device 29. The dump truck 2 comprises a position detector 35 for detecting a position of the dump truck 2, and a wireless communication device 36 for making communication with the management device 10 illustrated in FIG. 1, for example.

The traveling speed detector 31 detects a traveling speed Vs of the dump truck 2. The traveling speed detector 31 includes a rotation speed sensor for detecting a rotation speed of the steering wheels 26F. A rotation speed of the steering wheels 26F is correlated with a traveling speed Vs of the dump truck 2, and thus a rotation speed value as a detected value of the rotation speed sensor is converted into a traveling speed value of the dump truck 2.

The acceleration detector 32 detects an acceleration As of the dump truck 2. An acceleration As of the dump truck 2 includes a positive acceleration and a negative acceleration (deceleration). According to the present exemplary embodiment, the calculation processing is performed based on a rotation speed value as a detected value of the rotation speed sensor for detecting a rotation speed of the steering wheels 26F, and thus the rotation speed value is converted into an acceleration value of the dump truck 2. More specifically, the acceleration detector 32 derives an acceleration As of the dump truck 2 based on a difference in traveling speed Vs for a predetermined time. For example, an acceleration As is derived based on a difference in traveling speed Vs for 0.5 [sec]. The traveling speed detector 31 and the acceleration detector 32 may be separate detectors.

The posture detector 33 detects a posture of the dump truck 2. A posture of the dump truck 2 includes at least one of a posture in the roll direction, a posture in the pitch direction, and a posture in the yaw direction. The posture detector 33 is a gyro or inertial measurement unit (IMU), for example. Gyro employs FOG (Fiber Optical Gyro) by way of example, but is not limited thereto. A posture in the yaw direction detected by the posture detector 33 is information on an orientation of the dump truck 2. That is, the posture detector 33 is mounted on the dump truck 2 as a work machine and is directed for measuring an orientation of the dump truck. The information on an orientation of the dump truck 2 is an azimuth θd1 indicating a posture in the yaw direction of the dump truck 2, for example. The azimuth θd1 is information on a direction in which the dump truck 2 travels, and the azimuth θd1 detected by the posture detector 33 will be denoted as first azimuth θd1 below as needed.

The position detector 35 includes a GPS receiver, and detects a GPS position (coordinate) of the dump truck 2. The GPS position is a position in the global coordinate system, and is indicated by at least latitude and longitude. The GPS position may further include altitude. The position detector 35 includes a GPS antenna 35A. The antenna 35A receives radio waves from the positioning satellites 5. The position detector 35 converts a signal based on radio waves from the positioning satellites 5 received by the antenna 35A into an electric signal, thereby to calculate a position of the antenna 35A. A GPS position of the antenna 35A is calculated thereby to detect a GPS position of the dump truck 2.

The communication system 9 includes the wireless communication device 36 provided in the dump truck 2. The wireless communication device 36 includes an antenna 36A. The wireless communication device 36 can make wireless communication with the management device 10 illustrated in FIG. 1.

The steering angle detector 37 detects a steering angle δ of the steering wheels 26F operated by the steering device 29 in the dump truck 2. The steering angle detector 37 may detect a steering angle δ based on a rudder angle of the steering wheels 26F. When the steering device 29 operates the steering wheels 26F based on a hydraulic pressure, the steering angle detector 37 may detect a hydraulic pressure for operating the steering wheels 26F thereby to detect a steering angle δ. Further, when the steering device 29 operates the steering wheels 26F based on the motor, the steering angle detector 37 may detect a signal to the motor thereby to detect a steering angle δ. Furthermore, when the dump truck 2 is provided with a driver's seat, the steering angle detector 37 may detect a rudder angle of the steering wheel (not illustrated) thereby to detect a steering angle δ.

The management device 10 transmits an instruction signal including the traveling condition information of the dump truck 2 to the control device 25 via the communication system 9. The control device 25 controls at least one of the drive device 24, the braking devices 28, and the steering device 29 in the dump truck 2 based on the traveling condition information supplied from the management device 10 such that the dump truck 2 travels according to the traveling condition information (including the target traveling course RP having a plurality of points PI and the target traveling speeds Vr of the respective points PI).

<Control System>

Figure 5:
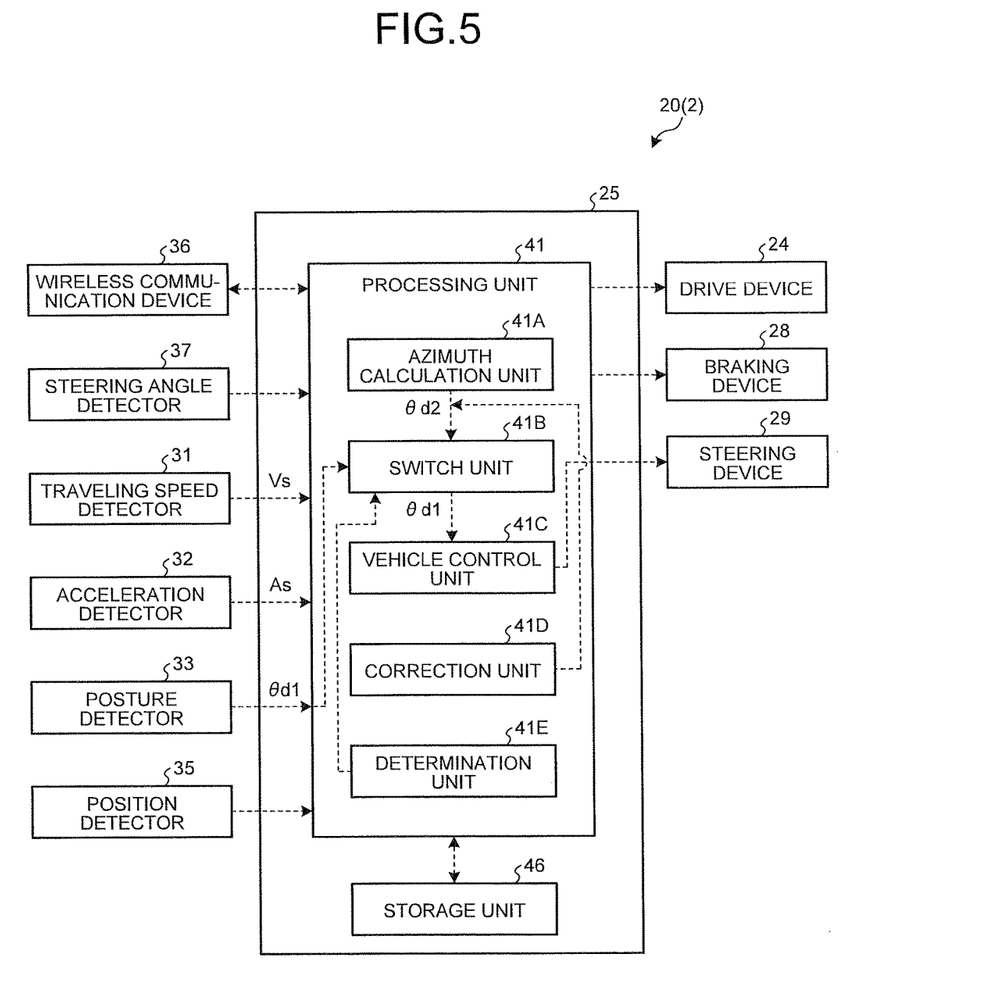
FIG. 5 is a control block diagram of a work machine control system according to the exemplary embodiment.

FIG. 5 is a control block diagram of a work machine control system 20 according to the present exemplary embodiment. In the following, the work machine control system 20 will be denoted as a control system 20 as needed.

The control system 20 is mounted on the dump truck 2.

As illustrated in FIG. 5, the control system 20 comprises the wireless communication device 36, the traveling speed detector 31, the acceleration detector 32, the posture detector 33, the position detector 35, the steering angle detector 37, the control device 25, the drive device 24, the braking devices 28, and the steering device 29.

The control device 25 comprises a processing unit 41 and a storage unit 46. The processing unit 41 comprises an azimuth calculation unit 41A, a switch unit 41B, a vehicle control unit 41C, a correction unit 41D, and a determination unit 41E.

The processing unit 41 acquires instruction data including the traveling condition information from the management device 10 output from the wireless communication device 36, traveling speed data indicating a traveling speed Vs of the dump truck 2 output from the traveling speed detector 31, acceleration data indicating an acceleration As of the dump truck 2 output from the acceleration detector 32, a first azimuth θd1 as one item of posture data indicating a posture of the dump truck 2 output from the posture detector 33, position data indicating a position of the dump truck 2 output from the position detector 35, and a steering angle δ output from the steering angle detector 37. The processing unit 41 outputs an accelerating instruction signal to the drive device 24, outputs a braking instruction signal to the braking devices 28, and outputs a steering instruction signal to the steering device 29.

The azimuth calculation unit 41A finds a second azimuth θd2 of the dump truck 2 by use of the steering angle δ detected by the steering angle detector 37. A method for finding the second azimuth θd2 will be described below. The switch unit 41B outputs either the first azimuth θd1 detected by the posture detector 33 or the second azimuth θd2 derived by the azimuth calculation unit 41A to the vehicle control unit 41C. More specifically, when the posture detector 33 is enabled, the switch unit 41B outputs the first azimuth θd1 of the dump truck 2 acquired by use of a posture of the dump truck 2 detected by the posture detector 33. When the posture detector 33 is disabled (or when a failure occurs in the posture angle detector 33), the switch unit 41B outputs the second azimuth θd2. The first azimuth θd1 detected by the posture detector 33 is preferentially used because the first azimuth θd1 detected by the posture detector 33 is generally more accurate than the second azimuth θd2 calculated by use of the steering angle δ detected by the steering angle detector 37.

The vehicle control unit 41C controls the steering device 29 by use of the first azimuth θd1 or the second azimuth θd2 output from the switch unit 41B. More specifically, the vehicle control unit 41C controls the steering device 29 based on the traveling direction at a present point of time of the dump truck 2 indicated by the first azimuth θd1 or the second azimuth θd2, and the traveling condition information (including the target traveling course RP having a plurality of points PI of which absolute positions are defined) transmitted from the management device 10 illustrated in FIG. 1 to the dump truck 2. The vehicle control unit 41C controls the drive device 24 and the braking devices 28, too. When the posture detector 33 is disabled (or a failure occurs therein), the vehicle control unit 41C may control the braking devices 28 thereby to rapidly stop the dump truck 2.

The correction unit 41D finds and outputs the amount of correction for correcting the second azimuth θd2 by use of the position of the dump truck 2 found by the position detector 35. The determination unit 41E determines a processing condition of the processing unit 41 in the control device 25.

<Dead-reckoning Navigation>

When the dump truck 2 travels along the carrying route HL in a mine illustrated in FIG. 1, the traveling condition information including the target traveling course RP having a plurality of points PI of which absolute positions are defined and the target traveling speeds Vr is transmitted from the management device 10 to the dump truck 2. The control device 25 in the dump truck 2, more specifically the vehicle control unit 41C of the processing unit 41 in the control device 25 controls the drive device 24, the braking devices 28 and the steering device 29 in the dump truck 2 such that the dump truck 2 travels at least along the target traveling course RP having a plurality of points PI and at the target traveling speeds Vr. The vehicle control unit 41C uses a method called dead-reckoning navigation, for example, when causing the dump truck 2 to travel.

When calculating the output signals to the drive device 24, the braking devices 28, and the steering device 29 in the dump truck 2, the control device 25 uses data such as the traveling speed Vs, the acceleration As and the posture (azimuth) of the dump truck 2 as well as the position of the dump truck 2 detected by the position detector 35 in addition to the traveling condition information transmitted from the management device 10 illustrated in FIG. 1. According to the present exemplary embodiment, the control device 25 causes the dump truck 2 to travel at least in some of the loading site LPA, the discharging site DPA, the carrying route HL, and a cross point IS according to the traveling condition information including the target traveling course RP and the target traveling speeds Vr set by the processing device 12 in the management device 10.

The dead-reckoning navigation is a navigation for estimating a current position of an object of interest (dump truck 2) based on an orientation from a well-known position (the amount of changed orientation) and a moving distance. An orientation (the amount of changed orientation) of the dump truck 2 is detected by the posture detector 33 arranged in the dump truck 2. A moving distance of the dump truck 2 is detected by the traveling speed detector 31 in the dump truck 2. A detection signal of the posture detector 33 and a detection signal of the traveling speed detector 31 are output to the control device 25 in the dump truck 2.

The control device 25 can find an orientation (the amount of changed orientation) of the dump truck 2 from a well-known point based on the detection signal from the posture detector 33. The control device 25 can find a moving distance of the dump truck 2 from a well-known point based on the detection signal from the traveling speed detector 31. The control device 25 generates the amount of control for the traveling of the dump truck 2 such that the dump truck 2 travels according to the generated traveling condition information including the target traveling course RP and the target traveling speeds Vr based on the detection signal from the posture detector 33 and the detection signal from the traveling speed detector 31. The amount of control includes an accelerating signal, a braking signal, and a steering signal. The control device 25 controls the traveling of the dump truck 2 based on the steering signal, the accelerating signal, and the braking signal.

There will be described below an example in which the dump truck 2 travels while an estimated position found by the dead-reckoning navigation is being corrected by use of GNSS. As the traveling distance of the dump truck 2 is longer, detection errors of at least one of the posture detector 33 and the traveling speed detector 31 are accumulated, and thus an error can be caused between an estimated position and an actual position. Consequently, the dump truck 2 can travel out of the target traveling course RP generated by the processing device 12.

Therefore, according to the present exemplary embodiment, the control device 25 causes the dump truck 2 to travel while correcting the position (estimated position) of the dump truck 2 derived (estimated) by the dead-reckoning navigation by use of the position data detected by the position detector 35.

<Control when Posture Detector 33 is Disabled>

According to the present exemplary embodiment, when causing the dump truck 2 to travel by the dead-reckoning navigation, the control device 25 basically uses the detection signal of the posture detector 33 as the information on an orientation of the dump truck 2. The information on an orientation of the dump truck 2 is a turning angle speed, an azimuth and the like of the dump truck 2, for example. However, when the posture detector 33 is disabled due to a failure in the posture detector 33, the control device 25 cannot acquire an orientation of the dump truck 2, and thus cannot cause the dump truck 2 to travel by the dead-reckoning navigation. Thus, according to the present exemplary embodiment, when the posture detector 33 is disabled, the control device 25 controls the steering device 29 by use of the second azimuth θd2, or an azimuth of the dump truck 2 found by the azimuth calculation unit 41A by use of the steering angle δ detected by the steering angle detector 37. With such control, the control device 25 can subsequently cause the dump truck 2 to travel by the dead-reckoning navigation along the target traveling course RP even when the posture detector 33 is disabled, thereby preventing the dump truck 2 from deviating from the carrying route HL.

Figure 6:
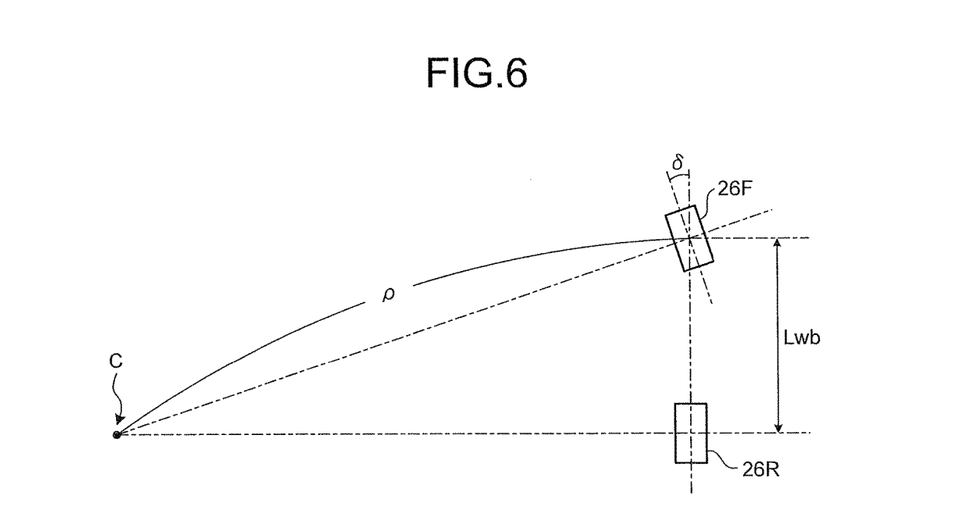
FIG. 6 is a diagram for explaining a method for finding a second azimuth.

FIG. 6 is a diagram for explaining a method for finding the second azimuth θd2. FIG. 6 illustrates a two-wheel model using the steering wheels 26F and the driving wheels 26R of the dump truck 2. With the two-wheel model, the second azimuth θd2 can be found by integrating an angular speed ω found in Equation (1) by time t.

$$\omega = d\theta d2/dt = Vs/\rho = Vs \times \sin \delta / Lwb \quad (1)$$

ρ in Equation (1) indicates a turning radius, which is a distance between the turning center C of the dump truck 2 and the center in the width direction of the steering wheels 26F. Lwb indicates a wheel base of the dump truck 2, which is a distance between the rotation centers of the steering wheels 26F and the driving wheels 26R. The wheel base Lwb is stored in the storage unit 46 illustrated in FIG. 5, for example. Vs indicates a traveling speed of the dump truck 2, which is detected by the traveling seed detector 31 illustrated in FIG. 5. δ indicates a steering angle of the steering wheels 26F, which is detected by the steering angle detector 37 illustrated in FIG. 5. The azimuth calculation unit 41A acquires the traveling speed Vs from the traveling speed detector 31, acquires the steering angle δ from the steering angle detector 37, and reads and gives the wheel base Lwb from the storage unit 46 to Equation (1) thereby to find the angular speed ω. The azimuth calculation unit 41A then integrates the resultant angular speed ω by time t thereby to find the second azimuth θd2.

Figure 7:
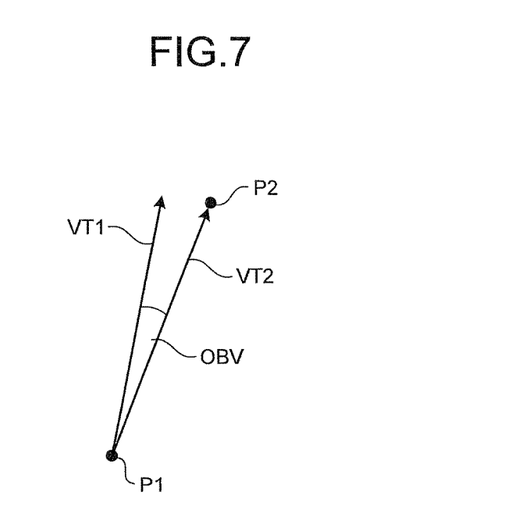
FIG. 7 is a diagram illustrating an observed value for finding the amount of correction.

FIG. 7 is a diagram illustrating an observed value OBV for finding the amount of correction. Errors of the second azimuth θd2 are accumulated with time, and thus the processing unit 41 in the control device 25 corrects the second azimuth θd2 by use of the amount of correction θdc found by the correction unit 41D. The amount of correction θdc is found in Equation (2).

$$θdc = OBV \times G \qquad (2)$$

OBV in Equation (2) indicates an observed value. The observed value is an angle difference between a first vector VT1 and a second vector VT2. The first vector VT1 is a vector in the traveling direction of the dump truck 2 found by the control device 25 in the dead-reckoning navigation (non-corrected position). The second vector VT2 is a vector in the moving direction of the dump truck 2 which is found by the respective coordinates of two positions P1 and P2 detected by the position detector 35. G indicates a correction gain, which assumes the observed value OBV multiplied by a predetermined correction gain G as the amount of correction θdc.

Figure 8:
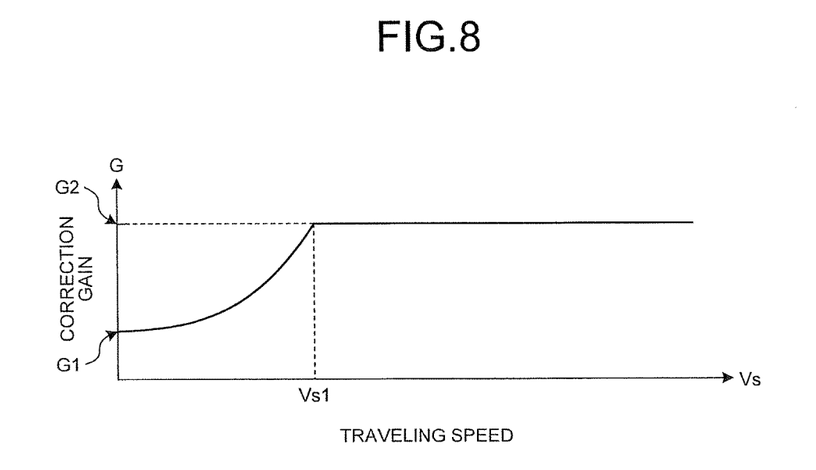
FIG. 8 is a diagram illustrating a relationship between a correction gain and a dump truck traveling speed.

FIG. 8 is a diagram illustrating a relationship between the correction gain G and the traveling speed Vs of the dump truck 2. The vertical axis in FIG. 8 indicates the correction gain G, and the horizontal axis indicates the traveling speed Vs. How to set a value of the correction gain G may be determined as appropriate, and FIG. 8 illustrates a relationship between the correction gain G and the traveling speed Vs of the dump truck 2 in order to describe an exemplary method for determining the correction gain G. The vertical axis in FIG. 8 indicates the correction gain G, and the horizontal axis indicates the traveling speed Vs of the dump truck 2. The traveling speed Vs is an absolute value.

A position detected by the position detector 35 is a GPS position according to the present exemplary embodiment. When an orientation is to be found based on the GPS position, as a distance between the two positions P1 and P2 is longer, or as the traveling speed Vs of the dump truck 2 is higher, reliability of an orientation or an observed value OBV is higher. Therefore, according to the present exemplary embodiment, the amount of correction θdc is changed based on the traveling speed Vs of the dump truck 2. More specifically, the correction gain G is set to increase as the traveling speed Vs of the dump truck 2 increases, and to be at a constant value G2 irrespective of the traveling speed Vs after the traveling speed reaches Vs1. That is, when the traveling speed Vs is lower (Vs1 or less), as the traveling speed Vs is lower, a weight on the azimuth calculated based on the GPS position is set to be smaller. When the traveling speed Vs increases to an extent, the reliability of the observed value OBV hardly changes, and thus when the traveling speed is Vs1 or more, the correction gain G is set at a constant value G2 irrespective of the traveling speed Vs. With the processing, the reliability of the observed value OBV is reflected on the amount of correction θdc, thereby enhancing an accuracy of the corrected second azimuth θd2c.

The relationship between the correction gain G and the traveling speed Vs of the dump truck 2 is stored in the storage unit 46 illustrated in FIG. 5. The correction unit 41D acquires the resultant position by the dead-reckoning navigation thereby to find the first vector VT1, and acquires the coordinates of the two positions P1 and P2 detected by the position detector 35 thereby to find the second vector VT2. The correction unit 41D acquires the correction gain G corresponding to the traveling speed Vs of the dump truck 2 from the traveling speed detector 31 by use of the relationship between the correction gain G and the traveling speed Vs of the dump truck 2 stored in the storage unit 46. The correction unit 41D gives the resultant first vector VT1, second vector VT2, and correction gain G to Equation (2) thereby to find the amount of correction θdc.

Figure 9:
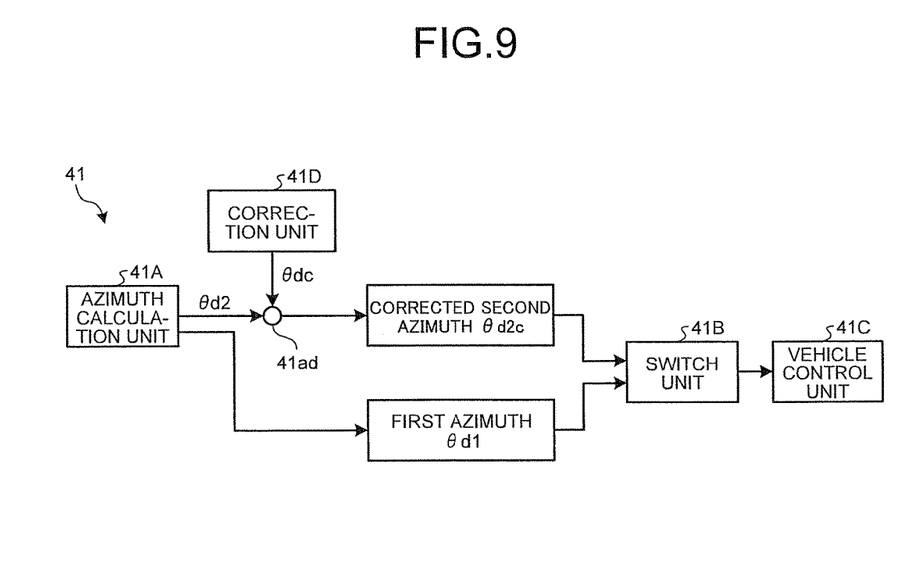
FIG. 9 is a control block diagram of a processing unit of a control device in the control system.

FIG. 9 is a control block diagram of the processing unit 41 of the control device 25 in the control system 20. The azimuth calculation unit 41A finds and outputs the second azimuth θd2 in Equation (1) to an adder/subtractor 41ad. The correction unit 41D finds and outputs the amount of correction θdc in Equation (2) to the adder/subtractor 41ad. The adder/subtractor 41ad adds the amount of correction θdc to the second azimuth θd2 thereby to find and output the corrected second azimuth θd2c to the switch unit 41B. The switch unit 41B is input with the first azimuth θd1 detected by the posture detector 33.

According to the present exemplary embodiment, the azimuth calculation unit 41A is assumed to find and output the first azimuth θd1 by use of the detected value of the posture detector 33 to the switch unit 41B, but is not limited thereto. When the azimuth calculation unit 41A finds the first azimuth θd1, the azimuth calculation unit 41A integrates the angular speed ω of the dump truck 2 detected by the posture detector 33 by time t thereby to find the first azimuth θd1. When the posture detector 33 can output both the angular speed ω and the azimuth, the first azimuth θd1 may be found by the posture detector 33.

The switch unit 41B switches the first azimuth θd1 and the corrected second azimuth θd2c to be output to the vehicle control unit 41C. According to the present exemplary embodiment, when the posture detector 33 is enabled, the switch unit 41B outputs the first azimuth θd1. In this case, the vehicle control unit 41C performs the dead-reckoning navigation by use of the first azimuth θd1, and controls at least one of the steering device 29, the drive device 24 and the braking devices 28. When the posture detector 33 is disabled, the switch unit 41B outputs the second azimuth θd2, In this case, the vehicle control unit 41C performs the dead-reckoning navigation by use of the second azimuth θd2, and controls at least one of the steering device 29, the drive device 24, and the braking devices 28.

According to the present exemplary embodiment, a cycle at which the correction unit 41D finds and outputs the amount of correction θdc may be longer than a cycle at which the azimuth calculation unit 41A finds and outputs the second azimuth θd2. In this case, the processing unit 41 finds the second azimuth θd2 at a cycle shorter than the cycle at which the amount of correction θdc is output, and corrects the second azimuth θd2 by the amount of correction θdc acquired at a cycle longer than the cycle at which the second azimuth θd2 is found.

A position of the dump truck 2 detected by the position detector 35 may be a GPS position, and a cycle at which the position detector 35 detects the GPS position may be longer than a cycle at which the steering angle detector 37 detects a steering angle δ. Therefore, when the second azimuth θd2 is found by use of only the GPS position, the information on the second azimuth θd2 is less likely to be input, and thus when the control device 25 controls the dump truck 2 by use of a detection result of the position detector 35, the accuracy may lower. According to the present exemplary embodiment, the control device 25 finds the second azimuth θd2 by use of the steering angle δ detected at a cycle shorter than the cycle at which the GPS position is detected so that when the posture detector 33 is disabled, the accuracy at which the steering device 29 in the dump truck 2 is controlled can be prevented from lowering.

Two GPS antennas 35A are installed at different positions in the dump truck 2 and an orientation of the dump truck 2 may be found by two positions detected by the two GPS antennas 35A, and in this case, two GPS antennas 35A are required. The azimuth calculation unit 41A finds the second azimuth θd2 by use of the steering angle δ so that the steering angle δ can be detected by the steering angle detector 37 already provided in the dump truck 2. Therefore, the second azimuth θd2 is found by use of the steering angle δ, and thus additional instruments such as GPS antennas 35A are not required, thereby preventing an increase in manufacturing cost of the dump truck 2.

Figure 10:
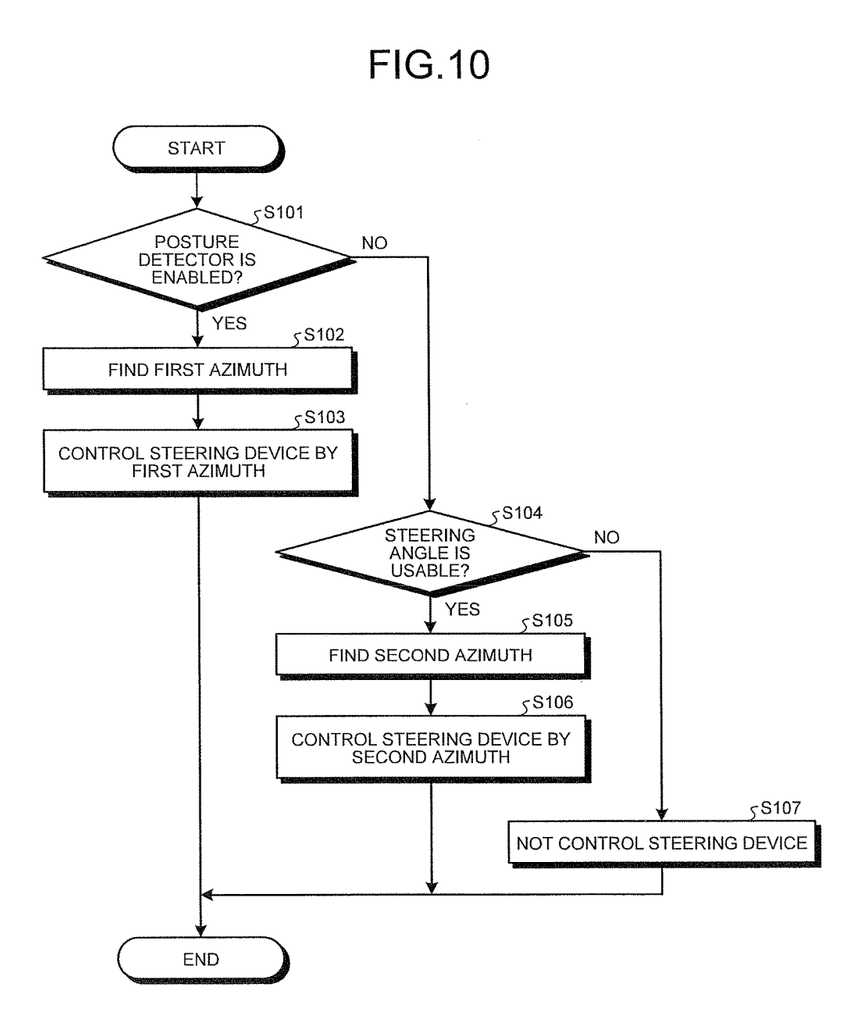
FIG. 10 is a flowchart illustrating an exemplary method for controlling a work machine according to the exemplary embodiment.

FIG. 10 is a flowchart illustrating an exemplary method for controlling a work machine according to the present exemplary embodiment. In step S101, the determination unit 41E of the processing unit 41 in the control device 25 illustrated in FIG. 5 determines whether the posture detector 33 is enabled. When at least one of the following condition (1) to condition (4) is met, for example, the determination unit 41E determines that the posture detector 33 is disabled.

(1) Communication is interrupted from the posture detector 33.
(2) The determination unit 41E acquires error information on an internal failure from the posture detector 33.
(3) The posture detector 33 is determined as freezing.
(4) The posture detector 33 is determined as drifted.

When the determination unit 41E determines that the posture detector 33 is enabled (step S101, Yes), in step S102, the azimuth calculation unit 41A in the processing unit 41 finds the first azimuth θd1. The switch unit 41B in the processing unit 41 switches the azimuth to be output to the vehicle control unit 41C to the first azimuth θd1. In step S103, the vehicle control unit 41C in the processing unit 41 controls the steering device 29 and the like by use of the first azimuth θd1 input from the switch unit 41B.

In step S101, when the determination unit 41E determines that the posture detector 33 is disabled (step S101, No), in step S104, the determination unit 41E determines whether the steering angle δ is usable. When at least one of the following condition (5) and condition (6) is met, the determination unit 41E determines that the steering angle δ is not usable.

(5) The steering angle detector 37 is determined as failing.
(6) Information of the position detector 35 is determined as unreliable.

In step S104, when the determination unit 41E determines that the steering angle δ is usable (step S104, Yes), in step S105, the azimuth calculation unit 41A finds the second azimuth θd2. The correction unit 41D illustrated in FIG. 9 finds the amount of correction θdc. The adder/subtractor 41ad adds the second azimuth θd2 and the amount of correction θdc, and outputs the corrected azimuth θd2c to the switch unit 41B. The switch unit 41B switches the azimuth to be output to the vehicle control unit 41C to the second azimuth θd2. In step S106, the vehicle control unit 41C controls at least the steering device 29 by use of the second azimuth θd2 input from the switch unit 41B. At this time, the vehicle control unit 41C may operate the braking devices 28 illustrated in FIG. 5 thereby to stop the dump truck 2.

In step S104, when the determination unit 41E determines that the steering angle δ is not usable (step S104, No), in step S107, the vehicle control unit 41C does not control the steering device 29. In this case, the vehicle control unit 41C operates the braking devices 28 thereby to stop the dump truck 2.

According to the present exemplary embodiment, as described above, the first azimuth θd1 may be found based on a detection result of the posture detector 33, the second azimuth θd2 may be found by the azimuth calculation unit 41A based on a detection result of the steering angle detector 37, and an azimuth to be used by the vehicle control unit 41C may be switched by the switch unit 41B. In this case, it is preferable that the posture detector 33 always finds and outputs the first azimuth θd1 except when it is disabled and the azimuth calculation unit 41A always finds and outputs the second azimuth θd2 except when the steering angle δ is not usable. By doing so, when the posture detector 33 is disabled, the switch unit 41B may only change an azimuth to be used by the vehicle control unit 41C from the first azimuth θd1 to the second azimuth θd2 or the corrected second azimuth θd2c. Therefore, a time required to switch an azimuth to be used by the vehicle control unit 41C is only the operation time of the switch unit 41B, thereby reducing a time required to switch an azimuth.

An azimuth to be used by the vehicle control unit 41C is switched by the switch unit 41B according to the present exemplary embodiment, but the first azimuth θd1 output by the azimuth calculation unit 41A illustrated in FIG. 9 and the corrected second azimuth θd2c output by the adder/subtractor 41ad may be switched not via the switch unit 41B and may be input into the vehicle control unit 41C. In this case, for example, when the posture detector 33 is enabled, the azimuth calculation unit 41A generates and outputs the first azimuth θd1 to the vehicle control unit 41C. When the posture detector 33 is disabled, the azimuth calculation unit 41A generates the second azimuth θd2, the correction unit 41D finds the amount of correction θdc, and the adder/subtractor 41ad outputs the corrected second azimuth θd2 to the vehicle control unit 41C. The vehicle control unit 41C controls the steering device 29 by use of the corrected second azimuth θd2 output from the adder/subtractor 41ad.

When the processing unit 41 does not include the correction unit 41D and the posture detector 33 is disabled, the azimuth calculation unit 41A generates and outputs the second azimuth θd2 to the vehicle control unit 41C. The vehicle control unit 41C controls the steering device 29 by use of the second azimuth θd2 generated by the azimuth calculation unit 41A. In this way, the vehicle control unit 41C controls the steering device 29 by use of the second azimuth θd2 generated by the azimuth calculation unit 41A.

In this way, according to the present exemplary embodiment, the vehicle control unit 41C controls the steering device 29 by use of the second azimuth θd2 or the corrected second azimuth θd2 acquired by correcting the second azimuth θd2. The corrected second azimuth θd2 is also found by the second azimuth θd2, and thus the use of the corrected second azimuth θd2 by the vehicle control unit 41C is the use of the second azimuth θd2. That is, the vehicle control unit 41C controls the steering device 29 based on the second azimuth θd2.

According to the present exemplary embodiment, the vehicle control unit 41C may control the steering device 29 by use of the first azimuth θd1 and the second azimuth θd2 or the corrected second azimuth θd2. For example, the vehicle control unit 41C may control the steering device 29 by use of an average value between the first azimuth θd1 and the second azimuth θd2 or the corrected second azimuth θd2. As described above, the corrected second azimuth θd2 is also found by the second azimuth θd2, and thus the use of the corrected second azimuth θd2 by the vehicle control unit 41C is the use of the second azimuth θd2. That is, according to the present exemplary embodiment, the vehicle control unit 41C can control the steering device 29 based on at least one of the first azimuth θd1 and the second azimuth θd2.

Figure 11:
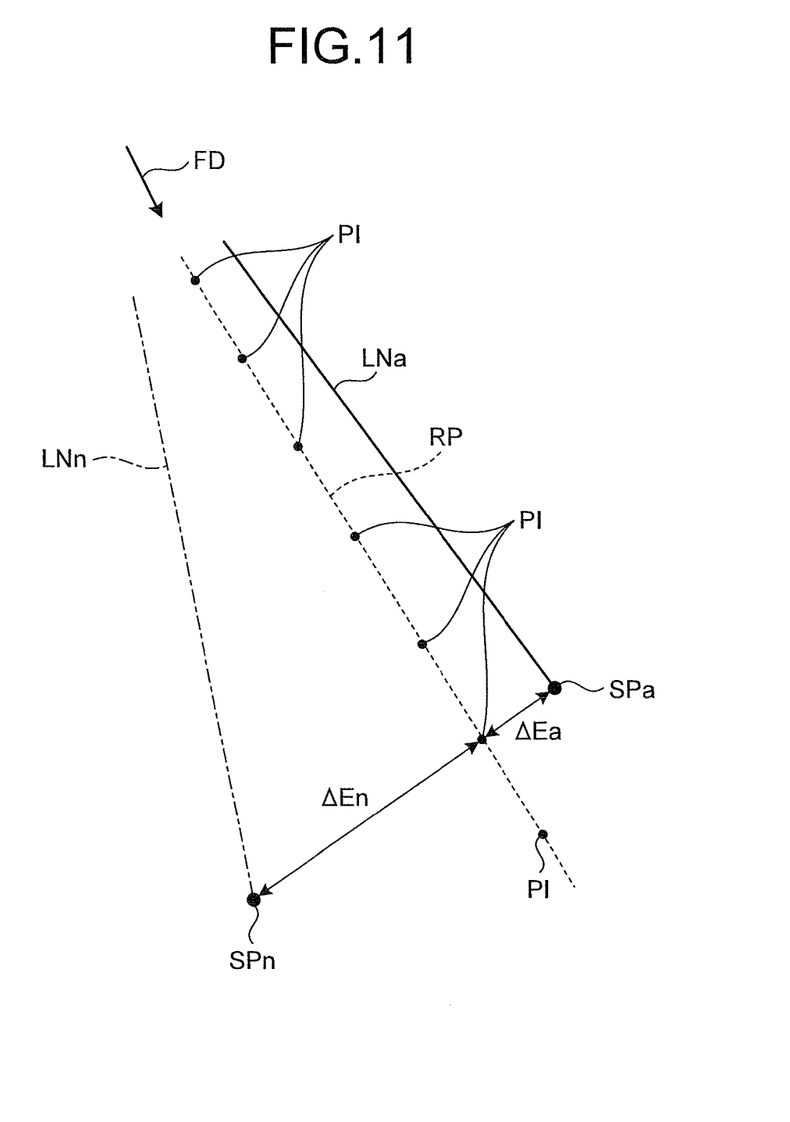
FIG. 11 is a diagram illustrating the states when the method for controlling a work machine according to the exemplary embodiment is performed and when it is not performed.

FIG. 11 is a diagram illustrating the cases when the method for controlling a work machine according to the present exemplary embodiment is performed and when it is not performed. A result when the method for controlling a work machine according to the present exemplary embodiment is performed is indicated in a solid line LNa, and a result when the method for controlling a work machine according to the present exemplary embodiment is not performed is indicated in a dotted line LNn. A broken line indicates the target traveling course RP defined by a plurality of points PI.

The solid line LNa among the results illustrated in FIG. 11 indicates a traveling course of the dump truck 2 when the posture detector 33 is disabled and then the second azimuth θd2 is used for steering while the dump truck 2 is traveling along the target traveling course RP. The dotted line LNn indicates a traveling course of the dump truck 2 when the posture detector 33 is disabled and then neither the first azimuth θd1 nor the second azimuth θd2 is used for steering similarly to the solid line LNa. A position SPa and a position SPn are the positions of the dump truck 2 at certain points of time when the method for controlling a work machine according to the present exemplary embodiment is performed and when it is not performed, respectively.

ΔEa indicates an offset from the target traveling course RP when the method for controlling a work machine according to the present exemplary embodiment is performed, and ΔEn is an offset from the target traveling course RP when the method for controlling a work machine according to the present exemplary embodiment is not performed. ΔEa indicates that the distance is shorter than ΔEn, or that an offset from the target traveling course RP is smaller when the method for controlling a work machine according to the present exemplary embodiment is performed. In this way, the method for controlling a work machine according to the present exemplary embodiment can prevent an offset from the target traveling course RP even when the posture detector 33 is disabled.

In this way, according to the present exemplary embodiment, for the unmanned work machines controlled to travel in a mine along the set target traveling courses, when a failure occurs in the device mounted on the work machine for detecting an orientation of the work machine, an offset from the target traveling course can be reduced. Therefore, according to the present exemplary embodiment, safety can be enhanced when a failure occurs in the device for detecting an orientation of the work machine.

According to the present exemplary embodiment, in order to find the observed value OBV, two GPS antennas 35A are installed at different positions on the dump truck 2 thereby to derive the second vector VT2 based on the two GPS positions P1 and P2, but the method is not limited thereto. For example, in order to find the observed value OBV, an orientation of the dump truck 2 may be found based on the two positions detected by the two GPS antennas 35A.

The description has been made assuming that the work machines are mining machines used in a mine by way of example according to the exemplary embodiment described above, but the work machines are not limited to mining machines, and may be work machines used in working sites and construction machines used in construction sites. The work machines include mining machines. The description has been made assuming that the "work machine control system" employs the system for controlling dump trucks in a mine on the ground by way of example according to the present exemplary embodiment, but the system is not limited thereto and may include a system for controlling other mining machines in a mine on the ground or work machines (such as wheel loaders) used in working sites.

The present exemplary embodiment has been described above, but the present exemplary embodiment is not limited by the aforementioned contents. The aforementioned components include ones easily assumed by those skilled in the art, substantially the same ones, or ones in an equivalent range. The aforementioned components can be combined as needed. At least one of various omissions, replacements, and changes of the components may be made without departing from the scope of the present exemplary embodiment.

REFERENCE SIGNS LIST

1 MANAGEMENT SYSTEM
2 DUMP TRUCK
10 MANAGEMENT DEVICE
20 CONTROL SYSTEM
21 TRAVELING DEVICE
22 VEHICLE MAIN BODY
24 DRIVE DEVICE
25 CONTROL DEVICE
26F STEERING WHEEL (WHEEL)
26R DRIVING WHEEL (WHEEL)
27 AXLE
28 BRAKING DEVICE
29 STEERING DEVICE
31 TRAVELING SPEED DETECTOR
32 ACCELERATION DETECTOR
33 POSTURE DETECTOR
35 POSITION DETECTOR
36 WIRELESS COMMUNICATION DEVICE
37 STEERING ANGLE DETECTOR
41 PROCESSING UNIT
41A AZIMUTH CALCULATION UNIT
41B SWITCH UNIT
41C VEHICLE CONTROL UNIT
41D CORRECTION UNIT
41E DETERMINATION UNIT
41ad ADDER/SUBTRACTOR
G CORRECTION GAIN
Lwb WHEEL BASE
OBV OBSERVED VALUE
RP TARGET TRAVELING COURSE
δ STEERING ANGLE
θd1 FIRST AZIMUTH
θd2 SECOND AZIMUTH
θd2c CORRECTED SECOND AZIMUTH
θdc AMOUNT OF CORRECTION

The invention claimed is:

1. A work machine control system comprising:
a steering device configured to operate steering wheels of a work machine;
a posture detector configured to detect a first azimuth as information on an orientation of the work machine;
a steering angle detector configured to detect a steering angle of the steering device;
an azimuth calculation unit configured to obtain a second azimuth of the work machine by using the steering angle detected by the steering angle detector;
a vehicle control unit configured to control the steering device based on at least one of the first azimuth and the second azimuth;
a position detector provided in the work machine, the position detector being configured to detect a position of the work machine; and
a correction unit configured to obtain and output an amount of correction for correcting the second azimuth by using the position of the work machine obtained by the position detector and correcting the second azimuth based on the amount of correction; and a switch unit receiving the first azimuth and the corrected second azimuth and selecting one of the first azimuth or the corrected second azimuth to be input into the vehicle control unit in response to an operating state of the posture detector, wherein the vehicle control unit is configured to control the steering device by using the first azimuth or the corrected second azimuth, and wherein the vehicle control unit controls the steering device based on the corrected second azimuth when the posture detector is disabled.

2. The work machine control system according to claim 1, wherein the vehicle control unit controls the steering device in the work machine by using the first azimuth when the posture detector is enabled.

3. The work machine control system according to claim 1, wherein the correction unit is configured to change the amount of correction based on a traveling speed of the work machine.

4. The work machine control system according to claim 1, wherein the vehicle control unit controls a braking device in the work machine to stop the work machine when the posture detector is disabled.

5. A work machine including the work machine control system according to claim 1.

6. A system comprising:

a work machine according to claim 5; and a work machine management system including a management device configured to output traveling condition information including a target traveling speed of the work machine and a target traveling course of the work machine to the work machine.

7. A method for controlling a work machine comprising:

determining whether a posture detector configured to detect a posture of a work machine is enabled; and controlling, by a vehicle control unit, a steering device configured to operate steering wheels of the work machine by using a first azimuth as information on an orientation of the work machine detected by the posture detector when the posture detector is enabled, and controlling the steering device by using a second azimuth of the work machine acquired by using a steering angle of the steering device in the work machine when the posture detector is disabled, wherein when the posture detector is disabled, the steering device is controlled based on the second azimuth which is corrected by using an amount of correction for correcting the second azimuth obtained by using a position of the work machine detected by a position detector provided in the work machine, and wherein the first azimuth and the corrected second azimuth are received by a switching unit configured to input the first azimuth or the corrected second azimuth into the vehicle control unit in response to an operating state of the posture detector.

8. A work machine management system comprising:

a position detector configured to detect a position of a work machine;

a traveling speed detector configured to detect a traveling speed of the work machine;

a steering device configured to operate steering wheels of the work machine;

a posture detector configured to detect a first azimuth as information on an orientation of the work machine;

a steering angle detector configured to detect a steering angle of the steering device;

an azimuth calculation unit configured to obtain a second azimuth of the work machine by using the steering angle detected by the steering angle detector; and a vehicle control unit configured to control the steering device based on at least one of the first azimuth and the second azimuth, wherein the vehicle control unit controls at least one of the steering device, a drive device of the work machine, and a braking device of the work machine based on the position of the work machine detected by the position detector, the traveling speed of the work machine detected by the traveling speed detector, and the first azimuth detected by the posture detector when the posture detector is enabled, and wherein the vehicle control unit controls the steering device based on the second azimuth corrected based on the position of the work machine detected by the position detector when the posture detector is disabled.

* * * * *